Oct. 14, 1969 MINORU ONO ET AL 3,472,703

METHOD FOR PRODUCING SEMICONDUCTOR DEVICES

Filed June 3, 1964 5 Sheets-Sheet 1

INVENTOR
Minoru ONO
Takahisa Nitta

BY

Wenderoth & Wenderoth

INVENTOR.
Minoru Ono
Takahisa Nitta
BY
Wenderoth & Wenderoth

INVENTOR
Minoru Ono
Takahisa Nitta

BY

Mesteru & Mesteru

METHOD FOR PRODUCING SEMICONDUCTOR DEVICES

INVENTOR.
Minoru Ono
Takahisa Nitta

BY

Wenderoth & Wenderoth

INVENTOR
Minoru Ono
Takahisa Nitta
BY
Mesterm & Mesterm

United States Patent Office 3,472,703

Patented Oct. 14, 1969

3,472,703

METHOD FOR PRODUCING SEMICONDUCTOR DEVICES

Minoru Ono and Takahisa Nitta, Kodaira-shi, Japan, assignors to Kabushiki Kaisha Hitachi Seisakusho, Tokyo-to, Japan, a joint-stock company of Japan Filed June 3, 1964, Ser. No. 372,350
Claims priority, application Japan, June 6, 1963, 38/28,767; June 24, 1963, 38/32,676
Int. Cl. H01l 7/00, 7/18
U.S. Cl. 148—1.5 19 Claims

ABSTRACT OF THE DISCLOSURE

A heat-treatment of a semiconductor device having a semiconductor substrate of, for example, silicon and an insulating film of, for example, silicon oxide formed in contact with said substrate by heating the device at a temperature not less than 75° C. for at least a few minutes, while applying an electric field across said insulating film, thereby controlling to a desired value the density of surface carriers induced in the surface of the substrate by the existence of said film. Further, a semiconductor device, in which ions or a charge existing in an insulating film covering the surface of a semiconductor substrate is accumulated locally in one surface side of the insulating film near or remote from the surface of the substrate.

This invention relates to semiconductor devices and more particularly to a new method for producing field-effect semiconductor devices.

In general, the commonly known methods for forming an oxide on the surface of a semiconductor substrate having any type of conductivity are as follows:

(a) The method of heating and causing oxidation;
(b) The method of electrically causing anodic oxidation; and
(c) The method of chemically forming an oxide film.

The formation of an oxide on a semiconductor substrate surface gives rise to a phenomenon whereby, in the case where the interior substance of the semiconductor substrate under the oxide film is of the p-type, a thin inversion layer of n-type is formed in the surface region of the semiconductor substrate just beneath the oxide film, and, in the case where the semiconductor substrate is of the n-type, a thin layer of even stronger n-type is formed in the surface region of the semconductor just beneath the oxide film. This phenomenon is disclosed in sources such as the Bell System Technical Journal, vol. 38, No. 3, 1959, pp. 749 to 783. It is also known that the results obtained through this phenomenon vary greatly because of differences in the method of forming the oxide film and in the method (such as the crystal pulling method or the floating-zone method) of producing the semiconductor substrate single crystal, and that it is difficult to attain stable reproducibility of this phenomenon.

It is an object of the present invention to utilize and put to practical use the advantageous features of this phenomenon, that is, the possibility of causing inversion of conductivity type or change in degree of conductivity in the surface part of the semiconductor substrate under the oxide film and the insensitivity of the semiconductor substrate to ambient influences because of the highly stable state of its surface maintained by the oxide film thereon.

It is a further object to exercise artificial control over the above mentioned inversion of conductivity type or increase or decrease in the conductivity and thereby to make possible the production of semiconductor devices having any desired characteristics.

The nature, principle, and details of the invention will be more clearly apparent by reference to the following description taken in conjunction with the accompanying drawings in which like parts are designated by like reference characters, and in which.

Figure 1:
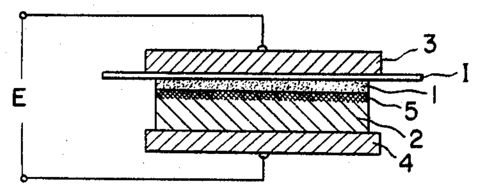
FIG. 1 is a diagrammatic view, in section, to be referred to in a description of the essential features of the method of producing semiconductor devices according to the invention.

Referring to FIG. 1, the semiconductor device shown therein comprises a p-type silicon semiconductor substrate 2 covered over one surface thereof by an oxide film such as, for example, a silicon dioxide film 1, an electrode 3 provided on the silicon dioxide film 1 substantially opposite the surface of substrate 2, and an electrode 4 connected conductively to another surface of the semiconductor substrate 2 opposite to the first surface adjacent to the silicon dioxide film 1.

A fundamental characteristic of the method of the invention is the heating of the semiconductor device thus composed. A second characteristic of great importance is the application of a direct-current voltage E between the two electrodes 3 and 4 during the heating process.

We have discovered that, by suitably selecting the temperature and time of the above mentioned heat treatment and the value and polarity of the applied voltage, it is possible to control at will the conductivtiy or surface carrier density of a sub-layer 5 (the surface region of the substrate being influenced in its conductivity by the oxide film thereover) to any desired value.

The heat treatment of the invention will be better understood from the description with respect to the following specific example of typical procedure.

For the semiconductor substrate 2 as shown in FIG. 1, a p-type silicon semiconductor crystal produced by, for example, the crystal pulling method and having a resistivity of 4 ohm-cm. is used. This semiconductor crystal is heat treated for one hour at 1,200 degrees C. in oxygen containing water vapor to form thereon a silicon dioxide film 1 of about 3,000 A. thickness. By this procedure, the part of the silicon semiconductor substrate 2 below the film 1 is changed in degree of conductivity, and sub-layer 5 (inversion layer) of n-type is formed.

As one example, a semiconductor substrate 2 of the above description was provided in an electrically contacting manner with an electrode 3 on its silicon dioxide film 1 side and an electrode 4 on its substrate 2 side. As will be described in detail hereinafter, the surface carrier density of the sub-layer 5 was first reduced to its minimum value by subjecting the combination thus composed to a heat-treatment, while a D-C voltage was being applied between the electrodes 3 and 4 so as to cause the electrode 3 to be negative with respect to the electrode 4. The surface carrier density of the layer 5 thus treated is approximately $2\times10^{11}$ electrons per square centimeter. Then, as a D-C voltage of 3 volts was applied to the electrodes 3 and 4 so as to cause the electrode 3 to be positive with respect to the electrode 4, the semiconductor device was heat treated for 20 minutes at a temperature of 350 degrees C. As a result, the surface carrier density of the inversion layer 5 formed in the silicon semiconductor substrate 2 increased to $2.8\times10^{12}$ electrons per square centimeter.

The surface carrier density of the inversion layer formed immediately below the oxide film 1 on the semiconductor substrate 2 as shown in FIG. 1 is not constant but deviates extremely in its as-formed state, that is, its state resulting from merely the formation of the silicon dioxide film 1. In contrast, in the case where the inversion layer 5 is heat treated while a voltage is applied to the device, the surface carrier denstiy can be expressed as a function of the heat treatment temperature and time, the voltage applied to the electrodes 3 and 4, and other factors and has almost no relationship to the conditions of formation of the silicon dioxide film 1 on the substrate 2. Accordingly, the surface carrier density can be readily controlled to any desired value.

Figure 2:
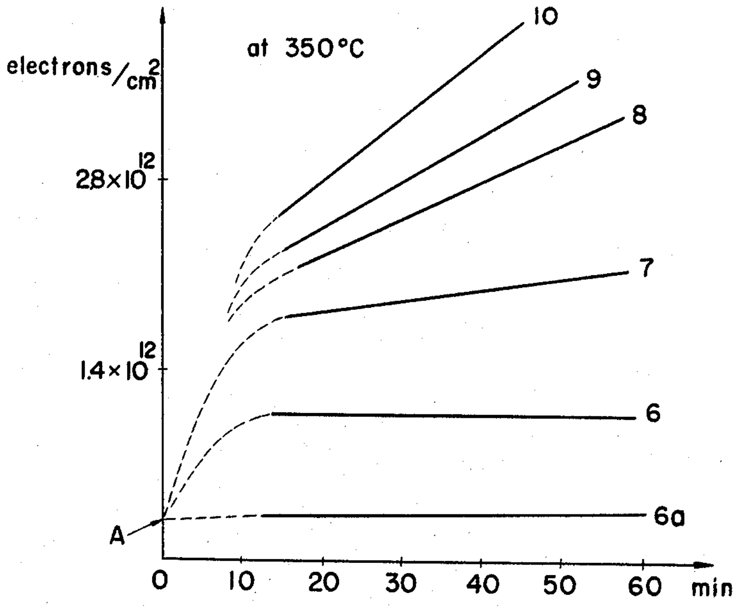
FIGS. 2 and 3 are graphical representations indicating the rates of surface n-type inversion of semiconductors, FIG. 2 indicating those with respect to time at constant temperature, and FIG. 3 indicating those with respect to temperature for the same time.

One example of variation of surface carrier density with respect to applied voltage and treatment time for the same temperature of 350 degrees C. is shown in FIG. 2, in which the ordinate represents the surface carrier density of the inversion layer, and the abscissa represents the treatment time. The curves **6*a*, 6, 7, 8, 9, and 10 shown in FIG. 2 respectively correspond to applied voltages of zero volt (state of open circuit between electrodes 3 and 4, or of the absence of the electrode 3), zero volt (short circuit state between electrodes 3 and 4), −0.5 volt, −1.5 volts, −2 volts, and −3 volts, where the voltage polarity indicates that of the semiconductor electrode in reference to the oxide electrode i.e., the polarity of electrode 4 in reference to electrode 3** in FIG. 1.

As is apparent from these curves in FIG. 2, in the case of constant treatment temperature, the surface carrier density increases in accordance with increasing the positive voltage applied to the electrode 3 with respect to the electrode 4. In case of short circuiting between the electrodes 3 and 4, the surface carrier density is relatively low, and, in the case of an open circuit between said electrodes, almost no variation is observable. It is to be observed, furthermore, that the rate of variation of the surface carrier density with respect to the heating time is abruptly rapid for a treatment time up to approximately 10 minutes but, thereafter, becomes substantially constant, the slopes of the curves decreasing with decreasing applied voltage until they approach zero. For this reason, it is desirable that the treatment time is more than 10 minutes.

Figure 3:
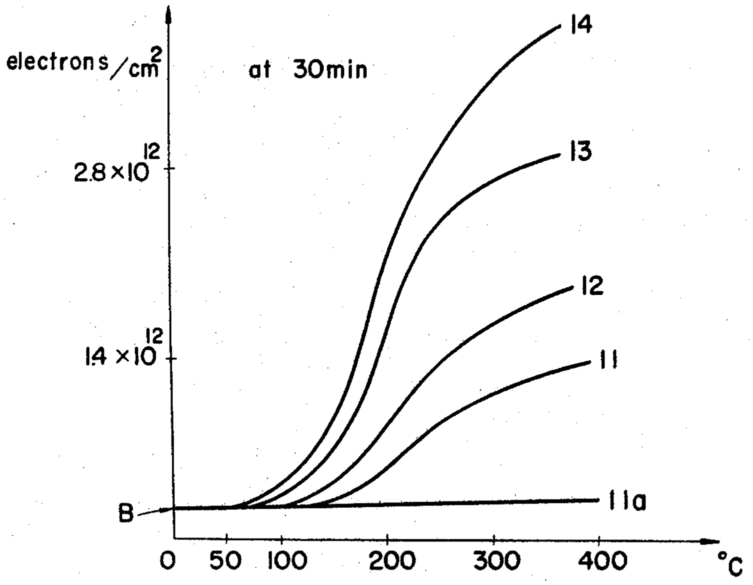

As another aspect of the treatment, an example of variation of surface carrier density with respect to heating temperature and applied voltage for the same treatment time of 30 minutes is shown in FIG. 3, in which the ordinate represents the surface carrier density of the inversion layer, and the abscissa represents the heating temperature. The curves **11*a*, 11, 12, 13, and 14 respectively correspond to applied voltage of zero volt (state of open circuit between electrodes 3 and 4, or of the absence of the electrode 3), zero volt (short circuit state between electrodes 3 and 4), −1 volt, −2 volts, and −3 volts, where the voltage polarity is that of the electrode 4 with respect to the electrode 3**.

As is apparent from these curves in FIG. 3, the case of constant treatment time, the surface carrier density increases in accordance with increase in the positive voltage applied to the electrode 3 with respect to the electrode 4, similarly as in the case illustrated in FIG. 2. In the case of short circuiting between the electrodes 3 and 4, the surface carrier density is relatively low, and, in the case of open circuit between said electrodes, almost no variation is observable. It is to be observed, furthermore, that the rate of variation of the surface carrier density with respect to the heating temperature is almost zero for heating temperatures up to approximately 75 degrees C. and increases rapidly between 75 and 250 degrees C., decreasing somewhat for higher temperatures. Therefore, it is apparent that a heat treatment temperature exceeding 75 degrees C. is necessary, and a heat treatment temperature of 250 degrees C. or higher, at which temperatures the slopes of the curves are relatively gradual, is preferable.

While in the examples illustrated in FIGS. 2 and 3, only heating temperatures up to about 400 degrees C. are indicated, it is possible, in general, to heat a semiconductor device of the above described character up to the lowest melting point among the melting points of the semiconductor and other elements such as the electrodes. The voltage applied to the electrodes 3 and 4 can be increased to the vicinity of the breakdown voltage of the oxide film, for example, the silicon dioxide film 1.

While the foregoing description relates to the case wherein the electrode 3 is caused to have positive potential, it has been found that in the case where, conversely, the electrode 3 is caused to have negative potential, or in the case where an open circuit is caused between the electrodes 3 and 4, the surface carrier density of the inversion layer 5 again exhibits a tendency to decrease.

For example, when a D-C voltage of −10 volts is applied to the electrode 3 of the above described semiconductor device with a surface carrier density of $3\times10^{12}$ electrons per square centimeter, and heat treatment is carried out on the semiconductor device for 30 minutes at a temperature of 350 degrees C., the surface carrier density of the inversion layer 5 decreases to $2\times10^{11}$ electrons per square centimeter (in which case, it is possible to decrease the surface carrier density much more rapidly than in the case wherein heat treatment is carried out with an open circuit state between the electrodes 3 and 4). It has been found, furthermore, that any further variation caused in the above treatment conditions causes almost no further decrease in the surface carrier density. This state corresponds to point A shown in FIG. 2 and point B shown in FIG. 3, and the value of this point is called the minimum surface carrier density.

Therefore, the mere formation of a silicon dioxide film results in extreme deviations in the surface carrier density of the inversion layer of the semiconductor device, and it is desirable to reduce the surface carrier density to its minimum value by applying an inverse direction voltage and then, by applying the required positive potential and carrying out the above described heat treatment, to control the surface carrier density to the desired value. Moreover, as is apparent from FIGS. 2 and 3, the desirable conditions of such a heat treatment are a treatment time of 10 minutes or more and a treatment temperature of 75 degrees C. or higher, preferably 250 degrees C. or higher but lower than a temperature at which the component parts such as the semiconductor and electrodes break down. By this procedure, the surface carrier density can be controlled in a very easy manner.

The method of the invention has been described above with respect to a representative example, but it is difficult to explain theoretically the reason for the surface carrier density being caused by this method to increase and decrease and being thereby controlled. However, the mechanism of this phenomenon may be considered to be according to the following description.

In the case when a positive voltage is applied to the electrode 3 with respect to the silicon semiconductor substrate 2, since an electric field is imparted to the silicon dioxide film 1, positive ions (positive charge) are accumulated in the part of the silicon dioxide film 1 opposite the part facing the electrode 3 provided on said film 1. It is believed that these positive ions attract the electrons within the silicon semiconductor substrate 2 to the vicinity of the interface between the silicon dioxide film 1 and the substrate 2 and cause this region to become a donor region. Consequently, in the case where a p-type silicon semiconductor substrate 2 is used and a silicon dioxide film 1 is formed on said substrate, an n-type inversion layer 5 is formed below the film 1. On the other hand, in the case where an n-type silicon semiconductor substrate 2 is used and a silicon dioxide film 1 is formed thereon, an $n^+$ layer of high conductivity is formed below the film 1. It is presumed that, when heating is carried out under the aforementioned conditions and followed by cooling to room temperature, the above said inversion layer 5 or the high-conductivity layer is formed. Since the aforementioned control can be accomplished by providing electrodes 3 and 4 on the silicon dioxide film 1 side and on the substrate 2 side, respectively, of the semiconductor device and heat treating the semiconductor as an electric field is imparted to the two electrodes 3 and 4, the same phenomenon is observable when a dielectric film I such as mica is interposed between the electrode 3 and the silicon dioxide film 1 as shown in FIG. 1, as has been confirmed in actual practice.

It has been found, furthermore, that in the practice of the method of this invention, the area, shape, and position of the inversion layer 5 are influenced by the area, shape, and position of the electrode 3 but are almost entirely free of any influence by the area, shape, and position of the electrode 4. This relationship may be explained in the following manner. When the semiconductor device is in the heated state, since the resistivity of the silicon semiconductor substrate 2 is much lower than that of the silicon dioxide 1 (dielectric film), the distributed voltage between the electrodes 3 and 4 becomes extremely high in the silicon dioxide film 1 and extremely low in the silicon semiconductor substrate 2. Consequently, an electric field is imparted mainly to the silicon dioxide film 1 immediately below the electrode 3.

Accordingly, the present invention, in another aspect thereof, contemplates the provision of a method of locally forming an inversion layer 5 or a high-conductivity layer on a selected part of the surface of the substrate 2 by suitably controlling the electrode 3.

It has been further found that, if the dielectric layer on the semiconductor is removed, the inversion layer or the high-conductivity layer in only the region below said dielectric layer disappears, and the region returns to the state of a semiconductor having no dielectric layer. By utilization of this phenomenon, it is possible to change the construction of the electrode variously.

The method of the invention will be further understood from the following description with respect to examples of its application to the production of field-effect type transistors with reference to FIGS. 4 through 9, inclusive.

In a generally known field-effect type transistor, two spaced, independent surface portions, preferably of a conductivity type opposite to that of the bulk, are formed in the surface of a semiconductor substrate of a certain conductivity type; a channel layer of the same conductivity type as said two surface portions for connecting said two surface portions is then formed by a method such as, for example, the diffusion method; a gate electrode is formed over a dielectric film such as a silicon dioxide film on said channel layer; and source and drain electrodes are formed to contact conductively the said two surface portions, respectively.

Figure 4:
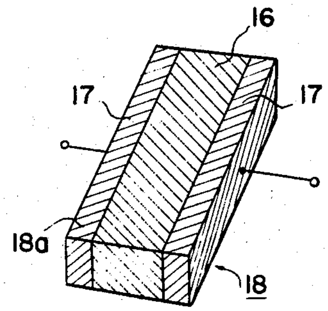
FIG. 4 is a perspective view showing one example of a semiconductor material suitable for use in the method of the invention.
Figure 5:
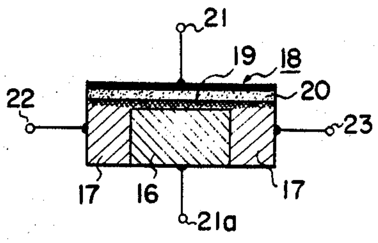
FIGS. 5 and 8 are diagrammatic sectional views, each showing an example of manner of application of the method of the invention.

In a specific example of such construction, shown in FIG. 4, a semiconductor plate consisting of an n-type silicon semiconductor substrate 16 with two p-type conductivity layers 17 formed at its sides is used as a semiconductor substrate 18. Next, a p-type channel layer 19 is formed by the diffusion method so as to span across the p-type conductivity layers 17 over one surface **18*a* of the semiconductor plate 18. A silicon dioxide film 20 is formed on the surface 18*a* of the semiconductor plate 18 as shown in FIG. 5. A gate electrode 21 is formed on the silicon dioxide film 20; a source electrode 22 and a drain electrode 23 are formed on respective p-type conductivity layers 17; and a gate electrode 21*a* is formed on the n-type semiconductor substrate 16**.

In the case of a conventional field-effect type transistor of the above described character, the conductivity of the p-type channel layer 19 should be merely a weak p-type or an i-type (intrinsic type), to obtain an appropriate characteristic. Hence the conductivity control of the p-type channel layer 19 by conventional technique like impurity diffusion is very difficult and the deviations of its characteristics are extremely large.

Figure 6:
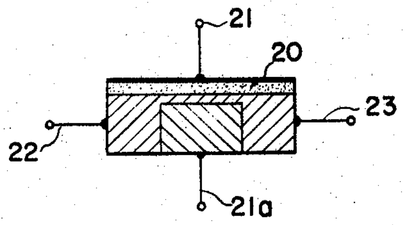
FIG. 6 is a diagrammatic sectional view of a semiconductor device produced by the method of the invention.

It was observed that, with respect to a conventional field-effect type transistor of the above described character, the aforedescribed method of the invention can be applied readily to control the inversion layer. Accordingly, the aforementioned heat treatment is carried out with the electrode 21 in a state of negative potential relative to the electrode **21*a* to control the surface carrier density of the p-type channel layer 19**. In this manner, it is possible to produce a field-effect transistor having a channel layer which is controlled to the desired characteristics as shown in FIG. 6.

Figure 7:
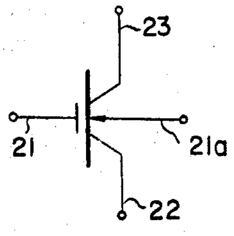
FIG. 7 is a simplified, symbolic diagram of the semiconductor device shown in FIG. 6.

The field-effect transistor produced in the above described manner may be represented by a simplified diagram as shown in FIG. 7. In actual use, a D-C voltage such as to cause the drain electrode 23 to be negative is applied to the source and drain electrodes 22 and 23 to cause a drain current $I_D$ to flow, and a D-C gate bias voltage $V_g$ is applied to the gate and source electrodes 21 and 22 so as to cause the source electrode 22 to be positive. Then, by varying the D-C gate bias voltage $V_g$, the drain current $I_D$ can be varied. The static characteristics of this variation are as indicated in FIG. 9.

Figure 9:
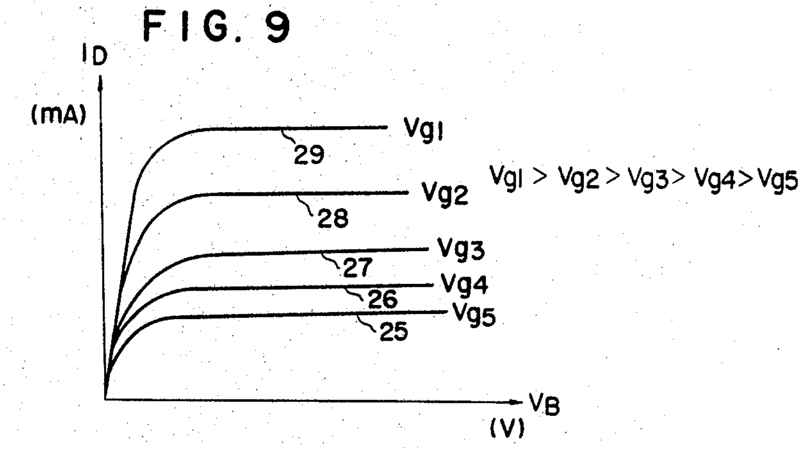
FIG. 9 is a graphical representation indicating the characteristics of the semiconductor device shown in FIG. 6.

In FIG. 9, the ordinate represents drain current $I_D$, and the abscissa represents voltage $V_B$ impressed across the source and drain electrodes 22 and 23. The curves designated by reference numerals 25, 26, 27, 28, and 29 respectively indicate the $V_B$ versus $I_D$ characteristics when the D-C gate bias voltage $V_g$ is varied, and indicate that the drain current $I_D$ increases as the D-C gate bias voltage increases.

While the above description relates to an example of application of the method of the invention to a field-effect transistor in which, with respect to an n-type semiconductor substrate, p-type source, drain, and channel layers are formed, it will be readily apparent to those skilled in the art that, by the application of the method of the invention to a field-effect transistor of conductivity states opposite to those described above, accurate control of the conductivity of the channel layers can also be achieved. The reason for this possibility is that the only difference between the two cases is whether the inversion layer is caused to operate to effect positive control of the channel layer thickness (increase the thickness) or whether it is caused to operate to effect negative control thereof (decrease the thickness).

While in the above described example, the present invention is applied to a conventional field-effect transistor, the inversion layer created below the silicon dioxide film can be utilized directly as the channel layer as is described hereinbelow with respect to an embodiment of the invention.

Figure 8:
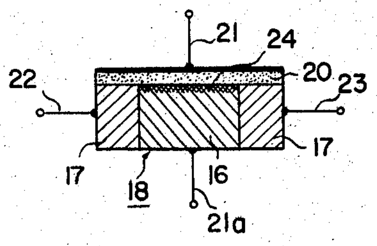

For the semiconductor substrate 18 as shown in FIG. 4, a semiconductor plate consisting of a p-type silicon semiconductor substrate 16 with n-type conductivity regions 17 formed on its two sides is used, and on one surface 18*a* of this semiconductor plate 18 a silicon dioxide film 20 is formed as shown in FIG. 8. On this film 20, a first gate electrode 21 is formed, and on the n-type conductivity regions 17, source and drain electrodes 22 and 23 are respectively formed. In addition, a second gate electrode 21*a* is formed on the p-type silicon semiconductor substrate 16.

With the semiconductor device in the above described state, the oxide layer 24 below the silicon dioxide film 20 is extremely unstable and has widely deviating characteristics. Since this layer, in this state, is unsuitable for use as a channel layer, the aforementioned heat treatment is carried out with the electrode 21 placed in a state of negative potential relative to the electrode 21*a* on the basis of the method of this invention. The surface carrier density is thus reduced to its minimum value. Then heat treatment is carried out again with the electrode 21 placed in a state of positive potential relative to the electrode 21*a*, whereby it is possible to obtain a field-effect transistor having a channel layer controlled to possess the desired characteristics as indicated in FIG. 6.

A simplified diagram of a field-effect transistor of the above described character is shown in FIG. 7. In actual practice, a D-C voltage such as to cause the source electrode 22 to be negative is impressed across the source and drain electrodes 22 and 23 to cause a drain current $I_D$ to flow, and a D-C gate bias voltage $V_g$ such as to cause the source electrode 22 to be similarly negative is impressed across the gate and source electrodes 21 and 22. By varying the D-C gate bias voltage $V_g$, it is possible to vary the drain current $I_D$, the static characteristics of the device being representable as indicated in FIG. 9, which has been described hereinbefore.

Figure 10:
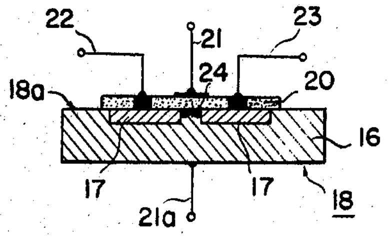
FIG. 10 is a diagrammatic sectional view of another semiconductor device produced by the method of the invention.

Another specific sample of a field-effect transistor obtained by the method of this invention is shown in FIG. 10. In this case a p-type silicon semiconductor of 200-micron thickness, 500-micron width, and 2000-micron length with a resistivity of 2 ohm-cm. was used as the semiconductor substrate 18, and on one surface of a semiconductor plate constituting a semiconductor substrate 16, two n-type conductivity layers 17, each of 100-micron width and 5-micron depth, were formed by diffusion at a mutual distance of 30 microns. In addition, a silicon dioxide film 20 was formed on one surface 18*a* of the semiconductor substrate 18 to a thickness of 3,000 A. at a temperature of 1,200 degrees C. in oxygen gas containing water vapor. Portions of the silicon dioxide film 20 above the n-type conductivity layers 17 were removed, and source and drain electrodes 22 and 23 were connected to respective layers 17. A metal electrode (first gate electrode) 21 was provided to contact intimately the portion of the oxide film opposite the region 24 separating the n-type conductivity portions 17, 17, and furthermore, a second gate electrode 21*a* was connected to the p-type silicon semiconductor substrate 16.

Figure 11:
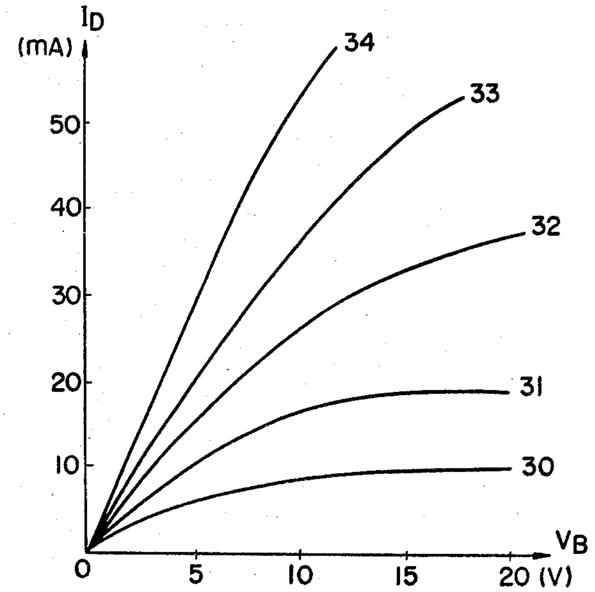
FIGS. 11 and 12 are graphical representations, each showing characteristic curves of the semiconductor device shown in FIG. 10.

As a result, in such a case, a very unstable conductive channel 24 constituting a connection between the n-type conductivity layers 17, 17 is formed below the silicon dioxide film 20. Consequently, the static characteristics under this state are extremely poor in the low voltage region as indicated in FIG. 11. Moreover, the value of $g_m$ (the proportion of variation of the output current with respect to the variation of the input voltage, larger magnitudes thereof affording higher amplification factor) is very low and, furthermore, its deviation among individual products so produced is extremely large. In FIG. 11, the ordinate represents drain current $I_D$, and the abscissa represents voltage $V_B$ between the source and drain. The curves designated by reference numerals 30, 31, 32, 33, and 34 are characteristic curves respectively for the cases of D-C gate bias voltages of −40, −30, −20, −10, and 0 volts.

In view of the undesirable characteristics described above, the present invention contemplates, in the case of the above described example, a treatment process for the semiconductor device which comprises heat treating the device for 30 minutes at a temperature of 350 degrees C. as a D-C voltage of 10 volts is impressed across the gate electrodes 21 and 21*a* so as to cause the gate electrode 21 to be negative relative to the gate electrode 21*a*.

Figure 12:
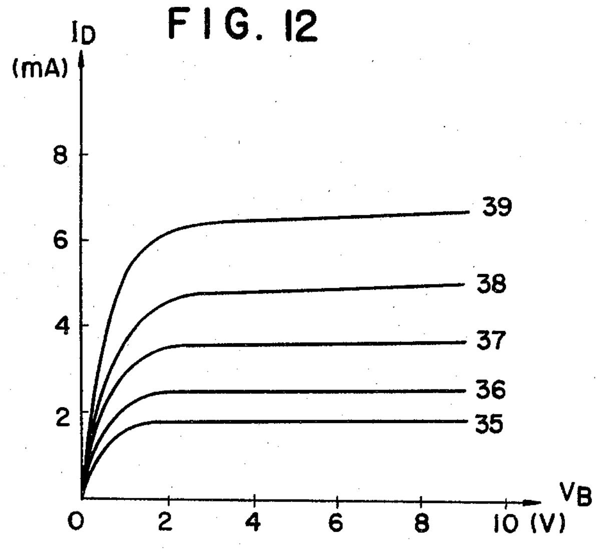

The field-effect transistor treated in this manner exhibits static characteristic curves as indicated in FIG. 12 and operates well even with a low signal input. Moreover, the characteristics are thus transformed into those of high stability with high-$g_m$ value. Furthermore, deviations between characteristics of individual products can be controlled to be practically zero. In FIG. 12, which has the same ordinate and abscissa as FIG. 11, the curves designated by reference numerals 35, 36, 37, 38, and 39 are characteristic curves respectively for the cases of D-C gate bias voltages $V_g$ of −0.6, −0.4, −0.2, 0 and +0.2 volt.

In general, since a field-effect transistor is operated by conductivity modulation of the channel layer, precise control of the conductivity of the channel layer is essential. However, by the diffusion or like method, the control of the conductivity is extremely difficult, and deviations in the characteristics cannot be avoided. Furthermore, these characteristics are greatly influenced by the method of producing the semiconductor base crystal and the method of forming the oxide film.

In the case of the field-effect transistor produced by the method of this invention, however, the conductivity of the channel layer can be readily controlled, as is clearly apparent also from FIGS. 2 and 3, and this control, moreover can be accomplished in a manner almost completely independent of the method of producing the semiconductor substrate crystal and that of forming the oxide film. Therefore, by producing a field-effect transistor in which the conductivity of the channel layer is especially controlled to correspond to the minimum surface donor density (point A in FIG. 2 and point B in FIG. 3), since the conductivity of the channel layer in this case does not decrease any further, an extremely stable field-effect transistor with no deviation of its characteristics is obtained.

In order to indicate still more fully the nature and wide applicability of the invention, the following description of an example of the application of the method of the invention to the production of metal-oxide-semiconductor diodes (hereinafter referred to as MOS diodes) is presented.

Figure 13:
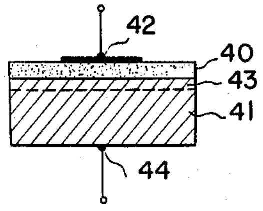
FIG. 13 is a diagrammatic sectional view showing another semiconductor device produced by the method of the invention.
Figure 14:
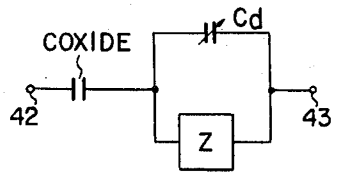
FIG. 14 is a schematic diagram showing an equivalent circuit of the semiconductor device shown in FIG. 13.

Referring to FIG. 13, the MOS diode shown therein in sectional view comprises a silicon dioxide film 40 of 3,000-angstrom thickness, a p-type silicon semiconductor substrate 41 of a resistivity of 4 ohm-cm., an aluminum electrode 42 of 2-mm. diameter provided on the silicon dioxide film 40, an oxide film sub-layer 43 created at the time of formation of the silicon dioxide film 40, and an electrical terminal 44 provided to electrically contact the substrate 41. This MOS diode may be represented schematically by an equivalent circuit as shown in FIG. 14, which is composed of a constant capacitance $C_{oxide}$ due to the silicon dioxide film 40, an impedance Z due to the surface state existing in the interface between the silicon dioxide film 40 and the semiconductor substrate 41, and a variable capacitance $C_d$ connected in parallel with the impedance Z and varying in its value in accordance with the voltage applied between the electrodes 42 and 43.

Figure 15:
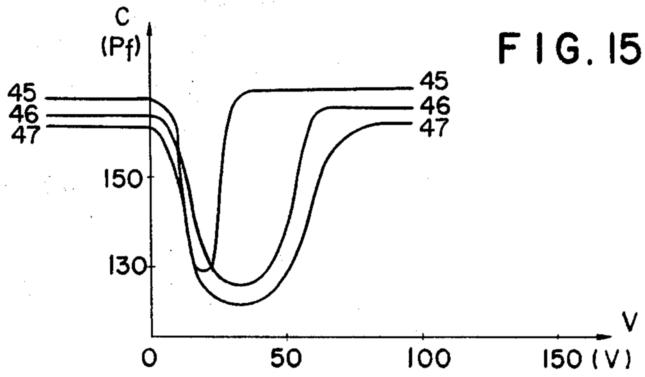
FIGS. 15, 16, and 17 are graphical representations indicating variations in the characteristic curves of the semiconductor device shown in FIG. 13 produced by the method of the invention.

When a D-C voltage V with an A-C voltage of 0.3-volt amplitude and 1,000-cycles/sec. frequency superimposed thereon is applied across the two terminals 42 and 44, and the electrostatic capacitance between the two terminals is measured for varying the impressed D-C voltage V, curves as shown in FIG. 15 are obtained. In FIG. 15, the ordinate represents electrostatic capacitance C, and the abscissa represents D-C voltage V impressed across the two terminals. The curves designated by reference numerals 45, 46, and 47 respectively indicate the voltage dependence characteristics of electrostatic capacitance of different samples. It is to be observed that the deviations between different characteristics are considerably large.

Figures 16, 17:
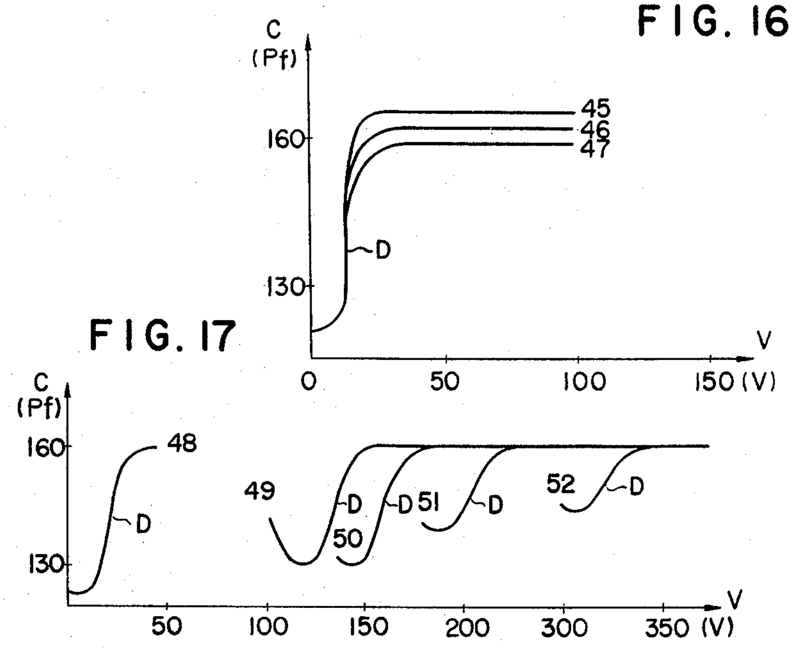

In one instance, an MOS having characteristics as described above was subjected to heat treatment, according to the method of this invention, for approximately 15 minutes at a temperature of 350 degrees C. while a D-C voltage of 20 volts such as to cause the side of the p-type silicon semiconductor substrate 41 to be of positive potential was impressed across the two terminals 42 and 44. The diode was then cooled, and the characteristics were measured under the same conditions as in the case of FIG. 15. As a result, the characteristic curves shown in FIG. 16 were obtained. In FIG. 16, the ordinate represents electrostatic capacitance C, and the abscissa represents D-C voltage V impressed across the two terminals. It is to be observed that the rising points of the electrostatic capacitance with respect to D-C bias of the curves are substantially coincident.

Deviations between the curves are observable in their flat parts corresponding to saturation. By experimental verification, we have found that these deviations depend on deviation in the area of the aluminum electrode 42 provided on the silicon dioxide film 40, and that, by unifying the area of the aluminum electrode 42, MOS diodes of coincident characteristics can be readily produced.

We have found, further, that position of the part D (shown in FIG. 16) of large voltage dependence of the electrostatic capacitance can be controlled at will by appropriately selecting the conditions such as those associated with the voltage application and the heat treatment. More specifically, when a D-C voltage of 3 volts is impressed across the two terminals 42 and 44 so that the silicon semiconductor substrate becomes negative, and the treatment time at the temperature of 350 degrees C. is increased, the characteristic curves gradually shift to the right as indicated in FIG. 17, in which the ordinate represents electrostatic capacitance C, the abscissa represents voltage V impressed across the two electrodes, and the curves designated by the reference numerals 48, 49, 50, 51, and 52 are characteristic curves respectively indicating characteristics in the initial state, after heating for 5 minutes, after heating for 10 minutes, after heating for 20 minutes, and after heating for 33 minutes.

In this manner, the position of the variation point D (FIG. 16) of the electrostatic capacitance with respect to the D-C bias voltage can be selected at will by varying the treatment time. The factors determining this point D are, as mentioned hereinbefore, the impressed voltage, the heating temperature, and the treatment time.

As described above with respect to a few embodiments of the invention, by applying the method of the invention to the production of semiconductor devices, particularly field-effect semiconductor devices, variable-capacitance elements such as MOS diodes, and other related devices, it is possible to obtain readily semiconductor devices having electrically excellent, uniform characteristics.

Particularly in cases wherein, as described above, the method of this invention is applied to the production of semiconductor devices which are operated by electric fields such as field-effect transistors and MOS diodes, it is possible to cause the electrodes provided for application of electric fields to operate as active electrodes of the semiconductor devices.

While in the foregoing disclosure the present invention has been described with respect to embodiments thereof as applied to the production of a field-effect semiconductor and a variable-capacitance element, it will be apparent to those skilled in the art that the method of the invention can be readily applied to the production of other semiconductor devices.

Furthermore, while in the foregoing disclosure, cases wherein silicon and silicon dioxide are used as semiconductor substrates and surface film dielectric material, the invention is not to be limited to these materials but may be similarly practiced with equivalent effectiveness with respect to other semiconductor materials and dielectric materials.

We claim:

1. A method for controlling the density of surface carriers in a surface region of a semiconductor substrate of one conductivity type having a layer of dielectric material contiguous to said surface region comprising the steps of:

providing electrode means on said dielectric material layer to cover a preselected surface region of said semiconductor substrate, and subjecting said semiconductor substrate thus composed to a heat treatment at a temperature of at least 75° C. while applying an electric potential to said electrode means with respect to said semiconductor substrate to generate an electric field through said dielectric material layer without causing any damage to said semiconductor substrate, said dielectric material layer and said electrode means, said heat treatment being carried out for a sufficient time to control the density of surface carriers in said preselected surface region to a desired value.

2. The method as defined in claim 1, in which the area of said electrode means is less than that of said dielectric material layer.

3. The method as defined in claim 1, in which said electrode means are positively polarized against said semiconductor substrate during said heat treatment, thereby to increase the density of surface carriers in said preselected surface region below said electrode means to a more accumulated n-type.

4. The method as defined in claim 1, in which said electrode means are negatively polarized against said semiconductor substrate during said heat treatment, thereby to decrease the density of surface carriers in said preselected surface region below said electrode means to a lesser n-type.

5. The method as defined in claim 1, in which said electrode means first are negatively polarized against said semiconductor substrate to reduce the density of surface carriers in said preselected surface region to a minimum, and then positively polarized to increase the density of surface carriers in said preselected surface region to a desired value.

6. The method as defined in claim 1, in which said dielectric material is an oxide of said semiconductor substrate.

7. The method as defined in claim 6, in which said semiconductor substrate is silicon, said dielectric material is silicon dioxide and said heat treatment is carried out for at least 10 minutes.

8. A method for controlling the density of surface carriers in a surface region of a semiconductor substrate of one conductivity type having a layer of dielectric material contiguous to said surface region comprising the steps of:

providing electrode means on said dielectric material layer to cover a preselected surface region of said semiconductor substrate, subjecting said semiconductor substrate thus composed to a first heat treatment at a temperature of at least 75° C. while applying a negative potential to said electrode means against said semiconductor substrate without causing any damage to said semiconductor substrate, said dielectric material layer and said electrode means, said first heat treatment being carried out for a sufficient time to reduce the density of surface carriers in said preselected surface region to a minimum, and thereafter subjecting said semiconductor substrate to a second heat treatment at a temperature of at least 75° C. while applying a positive potential to said electrode means against said semiconductor substrate without causing any damage to said semiconductor substrate, said dielectric material layer and said electrode means, said second heat treatment being carried out for a sufficient time to increase the density of surface carriers in said preselected surface region to a desired value.

9. The method as defined in claim 8, in which said semiconductor substrate is silicon and said layer of dielectric material is silicon dioxide.

10. A method for controlling the density of surface carriers in a preselected surface region of a semiconductor substrate of one conductivity type having a layer of dielectric material contiguous to said preselected surface region comprising the step of:

subjecting said semiconductor substrate having said layer to a heat treatment at a temperature of not less than 75° C. in an electric field having a perpendicular direction to said layer and imparting a negative charge to said layer without causing any damage to said semiconductor substrate and said dielectric material layer, said heat treatment being carried out for a sufficient time to reduce the density of surface carriers in said preselected surface region induced by the presence of said layer to a minimum.

11. A method of heat treatment for semiconductor elements including a semiconductor substrate, a layer of dielectric material covering at least one part of the surface of said substrate, and an electrode provided on said layer of dielectric material, comprising the step of heating said semiconductor elements at a temperature of not less than 75 degrees centigrade for at least a few minutes while applying to said electrode an electric potential with respect to said semiconductor substrate to generate an electric field through said layer of dielectric material without causing any damage to said semiconductor element.

12. The method as defined in claim 11, in which said heat treatment is carried out for at least ten minutes.

13. The method as defined in claim 11, in which said heat treatment is carried out at a temperature of not less than 250 degrees centigrade.

14. The method as defined in claim 11, in which said potential of said electrode is negative with respect to said semiconductor substrate, whereby the density of surface electron carriers induced in the surface part of said substrate below said electrode by the presence of said layer covering thereon is reduced.

15. The method as defined in claim 11, in which said potential of said electrode is positive with respect to said semiconductor substrate, whereby the density of surface electron carriers induced in the surface part of said substrate below said electrode by the presence of said layer covering thereon is increased.

16. The method as defined in claim 11, in which an electrically short-circuited state is established between said electrode and said semiconductor substrate in said heat treatment.

17. The method as defined in claim 11, in which said dielectric material comprises an oxide of silicon.

18. A method of heat treatment for a semiconductor element including a semiconductor substrate and a layer of dielectric material covering at least one part of the surface of said substrate comprising the step of heating said element at a temperature of not less than 75 degrees centigrade for at least a few minutes while subjecting the said layer to an electric field without causing any damage to said semiconductor element.

19. A method of heat treatment for insulated gate type field effect devices comprising a semiconductor body including a pair of source and drain regions formed in a surface of said body, a gate electrode provided on said surface of said body, and an insulating film interposed between said body and said gate electrode, wherein the improvement comprises the step of heating said devices at a temperature of at least 75° C. for at least a few minutes while applying to said gate electrode an electric potential with respect to said body without causing any damage to said field effect devices.

References Cited

UNITED STATES PATENTS

| | | | |
|---|---|---|---|
| 2,845,375 | 7/1958 | Gobat et al. | 148—183 |
| 3,226,613 | 12/1965 | Haenichen | 148—33.3 |
| 3,303,059 | 2/1967 | Kerr et al. | 148—13 |

FOREIGN PATENTS

| | | |
|---|---|---|
| 782,863 | 9/1957 | Great Britain. |

RICHARD O. DEAN, Primary Examiner

U.S. Cl. X.R.

148—33.3, 181, 183, 186